Sept. 8, 1953

P. C. BOREL ET AL 2,651,681

AUTOMATIC SWITCHING SYSTEM

Filed May 11, 1950

19 Sheets-Sheet 1

Inventors
PIERRE C. BOREL
MARCEL R. MAUGE

By Robert Harding Jr.
Attorney

Sept. 8, 1953 P. C. BOREL ET AL 2,651,681
AUTOMATIC SWITCHING SYSTEM
Filed May 11, 1950 19 Sheets-Sheet 2

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Sept. 8, 1953 P. C. BOREL ET AL 2,651,681

AUTOMATIC SWITCHING SYSTEM

Filed May 11, 1950 19 Sheets-Sheet 5

Inventors
PIERRE C. BOREL
MARCEL R. MAUGE
By Robert Harding Jr.
Attorney

Sept. 8, 1953 P. C. BOREL ET AL 2,651,681

AUTOMATIC SWITCHING SYSTEM

Filed May 11, 1950 19 Sheets-Sheet 6

Inventors
PIERRE C. BOREL
MARCEL R. MAUGE
By Robert Harding
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Sept. 8, 1953

P. C. BOREL ET AL 2,651,681

AUTOMATIC SWITCHING SYSTEM

Filed May 11, 1950

19 Sheets-Sheet 10

Inventors
PIERRE C. BOREL
MARCEL R. MAUGE
By Robert Harding Jr.
Attorney

Inventors
PIERRE C. BORFL
MARCEL R. MAUGE
By Robert Harding Jr.
Attorney

Inventors
PIERRE C. BOREL
MARCEL R. MAUGE
By Robert Harding Jr.
Attorney

Sept. 8, 1953 P. C. BOREL ET AL 2,651,681

AUTOMATIC SWITCHING SYSTEM

Filed May 11, 1950 19 Sheets-Sheet 13

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

Sept. 8, 1953 | P. C. BOREL ET AL | 2,651,681

AUTOMATIC SWITCHING SYSTEM

Filed May 11, 1950 | 19 Sheets-Sheet 18

Inventors
PIERRE C. BOREL
MARCEL R. MAUGE
By Robert Harding Jr.
Attorney

Inventors
PIERRE C. BOREL
MARCEL R. MAUGE
By Robert Harding Jr.
Attorney

UNITED STATES PATENT OFFICE 2,651,681

AUTOMATIC SWITCHING SYSTEM

Pierre Charles Borel and Marcel Roger Mauge, Boulogne-Billancourt, France, assignors to International Standard Electric Corporation, New York, N. Y., a corporation of Delaware Application May 11, 1950, Serial No. 161,396
In France May 12, 1949

3 Claims. (Cl. 179—18)

The present invention relates to improvements in automatic switching systems used for instance in telephone exchanges, and particularly in automatic switching systems utilizing electrical marking characteristics.

One of the objects of the present invention is to provide a switching system wherein the required switching equipment is greatly reduced so as to minimize installation and maintenance expenses.

Another object of the present invention is to provide a switching mechanism permitting a rapid execution of switching operations such as to reduce equipment expenses.

According to one feature of the present invention there are provided in an automatic switching system, test means adapted to determine both the availability and characteristic of a circuit, simultaneously.

In accordance with the present invention, in order to ascertain whether a circuit has been reached by two different selector switches, there is provided switching means operative on one hand to disconnect a high value resistance connected after a free circuit is tested and to connect in place of this resistance a low value resistance. The potential difference at the terminals of this low value resistance is utilized to bias the grid of a vacuum tube, the cathode of which is brought to such a potential that the tube is blocked if only one selector switch has reached the desired circuit and unblocked if two selector switches have reached the circuit. In addition a cold cathode tube is provided, the anode of the vacuum tube being connected in one condition to the positive terminal of a high voltage source through a resistance, and in another condition to the control grid of the cold cathode tube which ionizes when said vacuum tube is blocked. A relay is provided, the winding of which is connected in series in the main anode circuit of said cold cathode tube the relay being arranged to control switching means in the register to control a new hunting operation in case of a double test.

The basic automatic switching arrangement in one embodiment of the present invention does not use any line relay or cut-off relay. When a subscriber closes the line circuit, a current flow is caused, which at a suitable point is used to characterize the state of the line, and in particular to cause the starting operation. In the embodiment considered, the negative terminal of a battery is connected to one of the ends of a 30,000 ohm resistance, the other end of said resistance being connected through a 15,000 ohm resistance to one of the line wires, while the other line wire is connected through a 15,000 ohm resistance to the positive terminal of the battery. Under such conditions, the potential difference at the terminals of the 30,000 ohm resistance is of about 24 volts when the line is calling.

The wire connected to the common point of 30,000 ohm resistances is brought to a potential of approximately −24 volts. The starting circuit is arranged to control the hunting for the calling line as soon as the potential of the wire is more than −35 volts. In the event in which a line presents an insulation lower than a predetermined value, for example 50,000 ohms, it is possible that, even when the line is not calling, the potential applied to the wire will be sufficiently near the calling potential to cause a false starting operation.

The present invention discloses an arrangement to prevent these disadvantages by providing a line circuit including a cut-off relay which is specially adopted to be used in conjunction with the basic switching system hereinafter described.

In accordance with this modification there is provided means used to disconnect said resistances from the line wires as soon as the calling line is connected to a line finder, the control of said means being effected directly by means of the potentials existing on the line wires as soon as the line finder is connected to said line wires.

The above-mentioned and other features and objects of this invention and the manner of attaining them will become more apparent and the invention itself will be best understood, by reference to the following description of embodiments of the invention taken in conjunction with the accompanying drawings, wherein.

Figure 1:
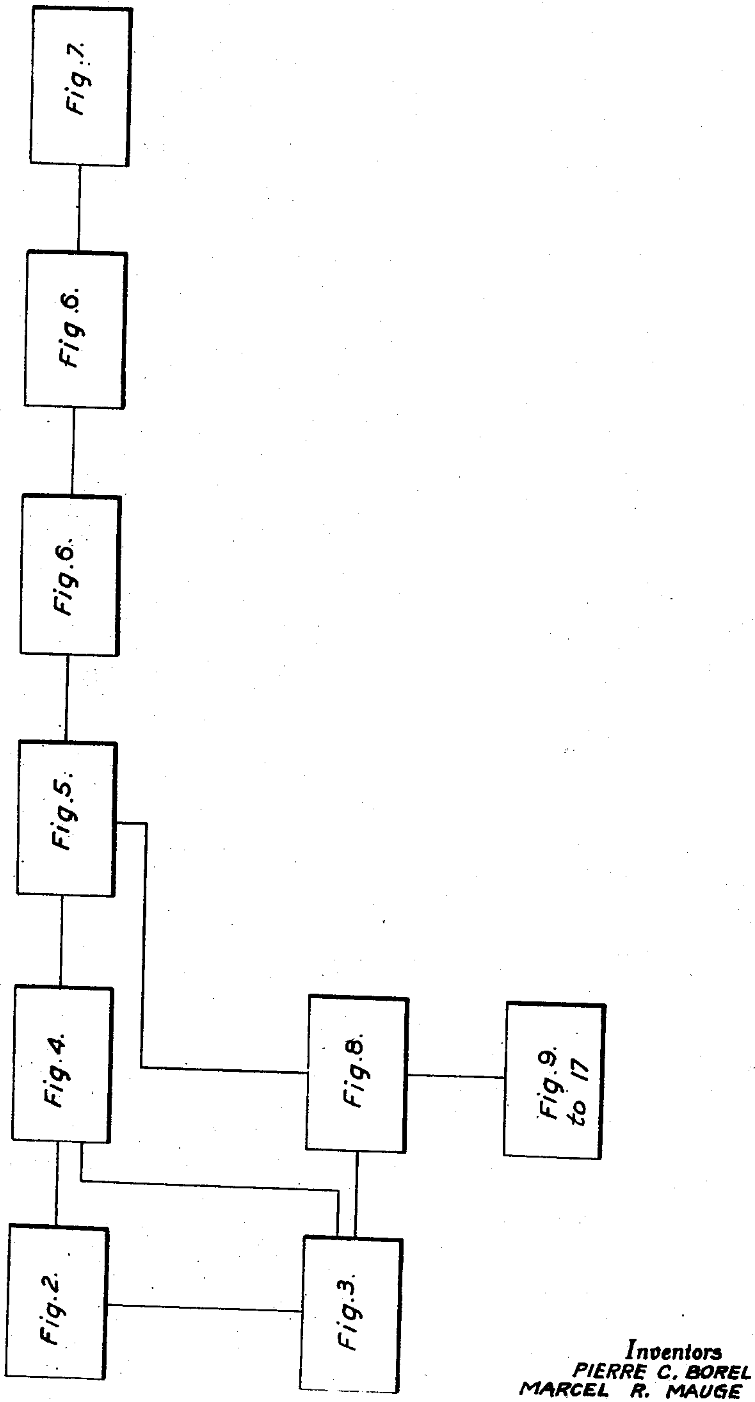
Figure 1 represents in block form the manner of joining certain of the drawings to form the circuitry of a described embodiment of the invention.
Figure 2:
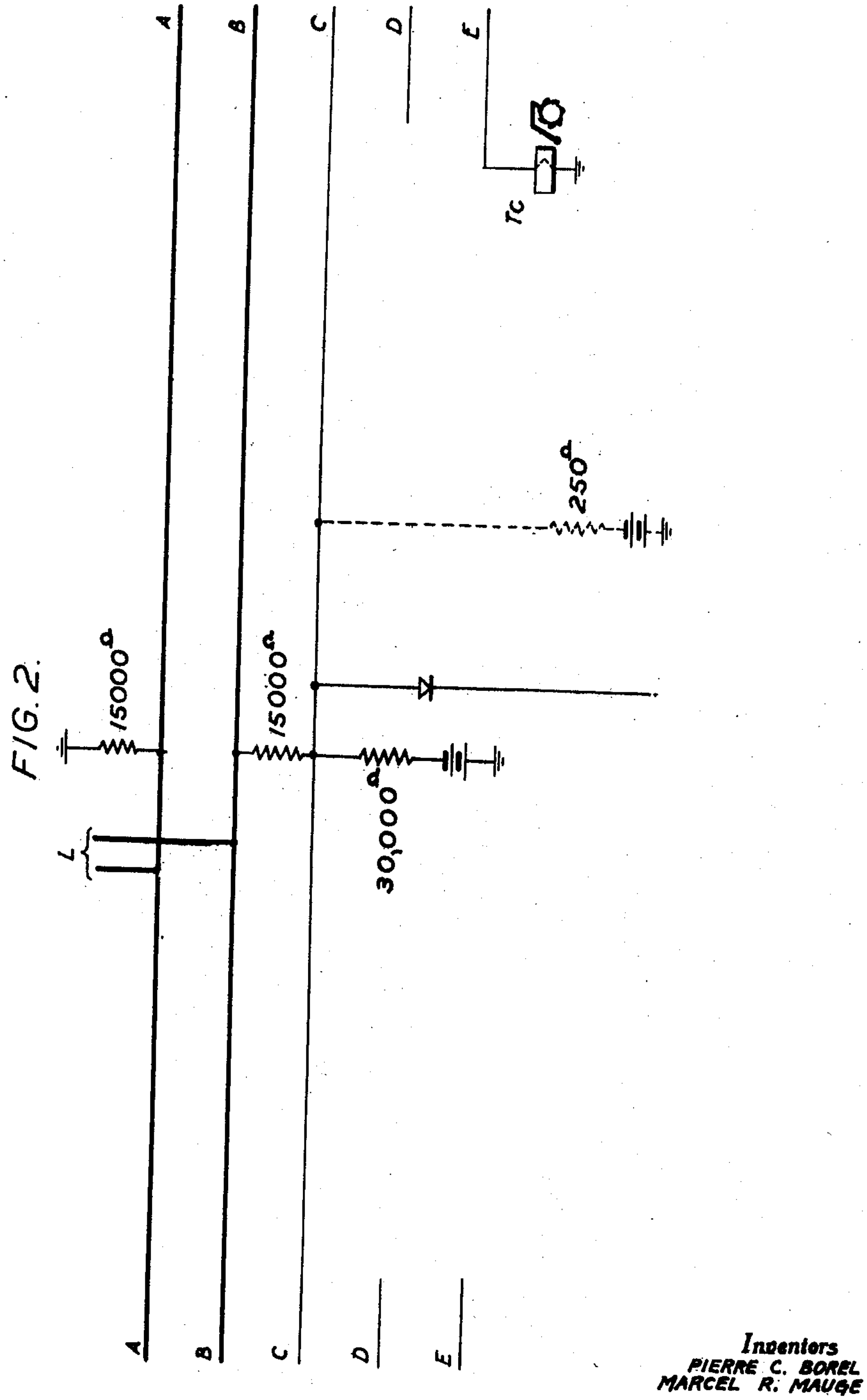
Figure 2 shows a well know line circuit without line and cut-off relays.

Referring to Fig. 2 it will be understood that when the line is calling wire C is brought to a potential of more than −35 volts and a current is established through the rectifying cell RD1 (Fig. 2) by means of the following circuit: ground (positive terminal of 48 volt battery), 15,000 ohm resistance, wire A, subscriber's station (L), wire B, 15,000 ohm resistance, rectifier RD1, rest of jack DJ (Fig. 3), rest of jack RJ, middle point of transformer ST1, rectifiers RD2 and RD3, windings of transformer ST2 and −35 volt potential source. The −45 volt potential is obtained by means of a potentiometer connected between the positive and negative terminals of the 48 volt battery.

Jack DJ allows a part of a different line circuit connected to the same starting circuit to be cut by groups to facilitate the fault hunting. Jack RJ allows a replacement of a defective starting circuit by another starting circuit. There may be provided e. g. for 20 starting circuits, two reserve circuits. The busying of a reserve circuit is signalled by the busy lamp OL. Jacks J1 and J2 are test jacks for performing tests necessary to adjust the starting circuit and to insure its proper operation.

In the absence of circulation current in rectifying cells RD2 and RD3, the 450 cycles alternating current which flows through the primary winding of transformer ST2 will not be transmitted from transformer ST2 towards transformer ST1, due to the high resistance presented by these rectifiers.

When a call takes place, rectifiers RD2 and RD3 are biased and the 450 cycles alternating current flows in both primary windings of transformer ST1. The potential difference which appears at the terminals of secondary winding of transformer ST1 is sufficient to ionise the cold cathode tube DV and consequently to operate relay A. Relay B energises then by means of the following circuit: ground, make contact of relay A, winding of relay B, and battery. Referring to Fig. 2 it will be clear that the 30,000 ohm resistance connected to the negative terminal of the 48 volt battery is opposed, in the absence of a call, to the biasing of rectifiers RD1, RD2 and RD3. If the fuse F is out, it will be clear that a line having a good insulation would nevertheless bias said cells and cause starting. To avoid such troubles, fuse F also controls the starting circuit and the lines served by the said starting circuit.

The circuit of relay A is controlled through the cathode tube DV, by the A. C. feeding transformer ST3. This relay releases then as soon as the ionization of cold cathode tube DV is suppressed; this occurring when the calling line is engaged or if the calling subscriber hangs up before being engaged. Relay B on operating connects the negative terminal of a 48 volt battery on wire 1 of the circuits of the line finders represented in Fig. 4. In order that the calling line will be hunted for by several line finder circuits, relay B connects a 48 volt battery through a 250 ohm resistance on wire 1 of the line circuits of a particular line finder group. In the described embodiment, there have only been represented two line finder circuit groups capable of reaching the calling line.

Relay B by its left hand make contact closes the circuit of lamp AL which thus show the busy condition of the starting circuit.

Figure 3:
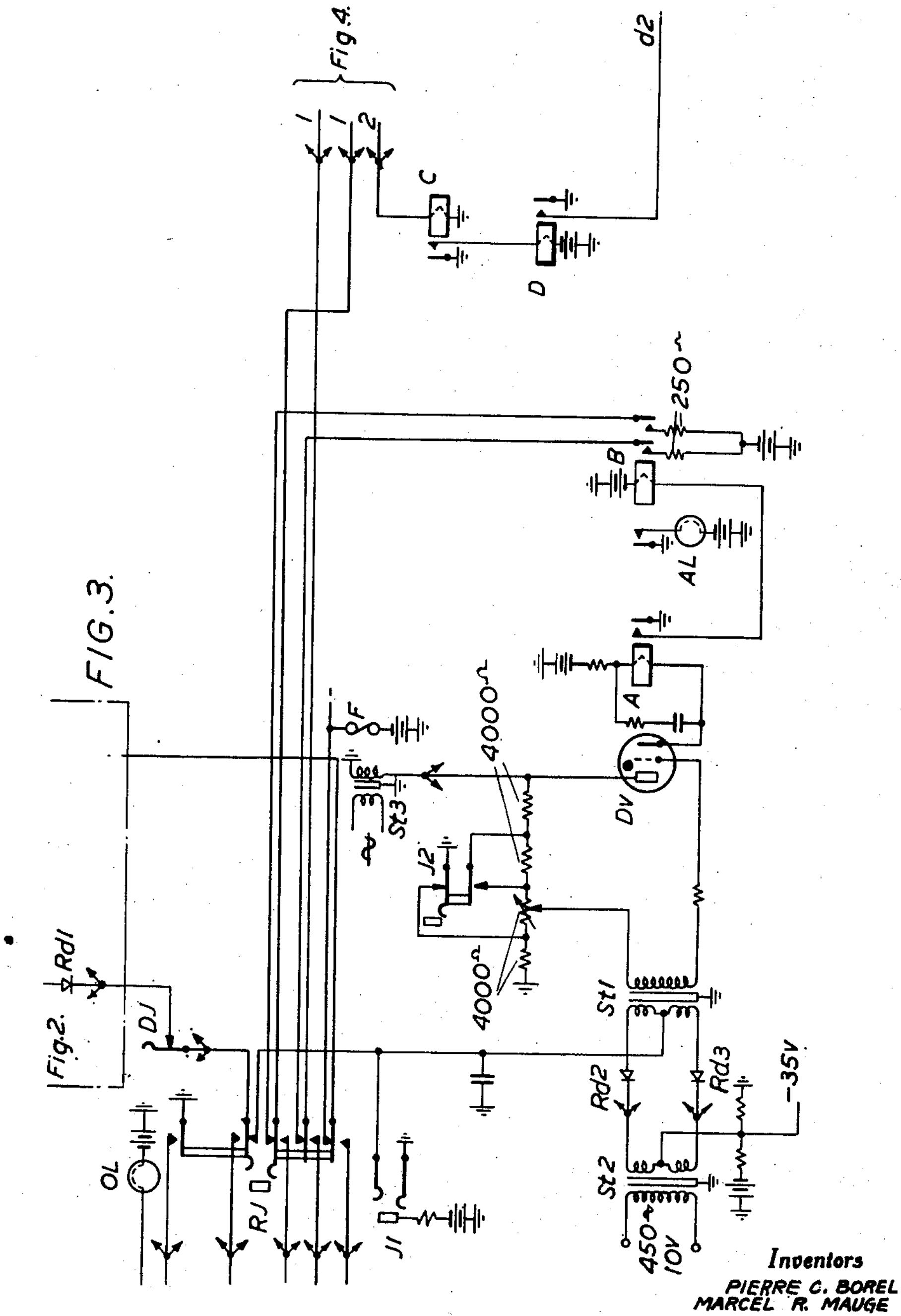
Figure 3 shows the starting circuit which completes the circuitry of Fig. 2, the circuit of Fig. 3 being common to a group of subscribers' lines.
Figure 4:
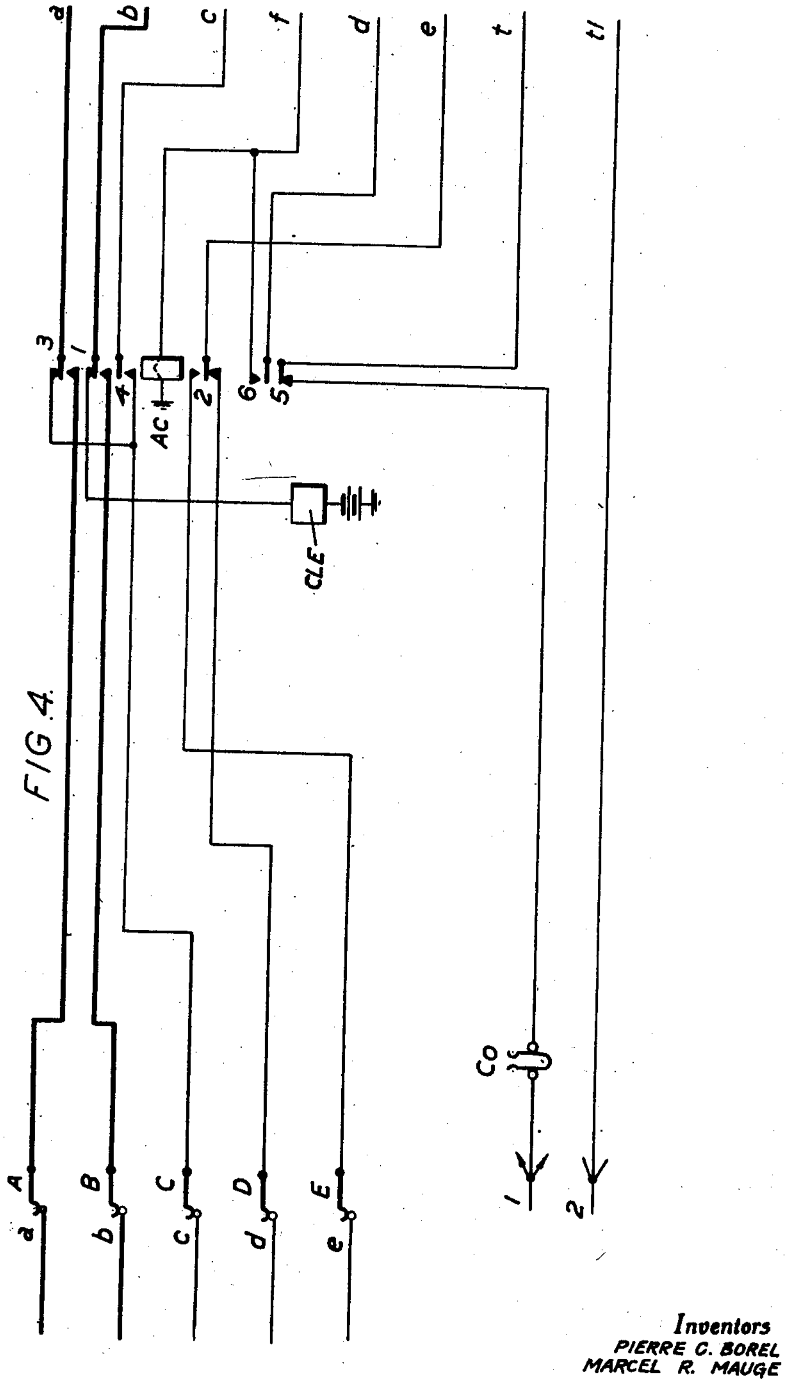
Figure 4 illustrates a line finder circuit.
Figure 5:
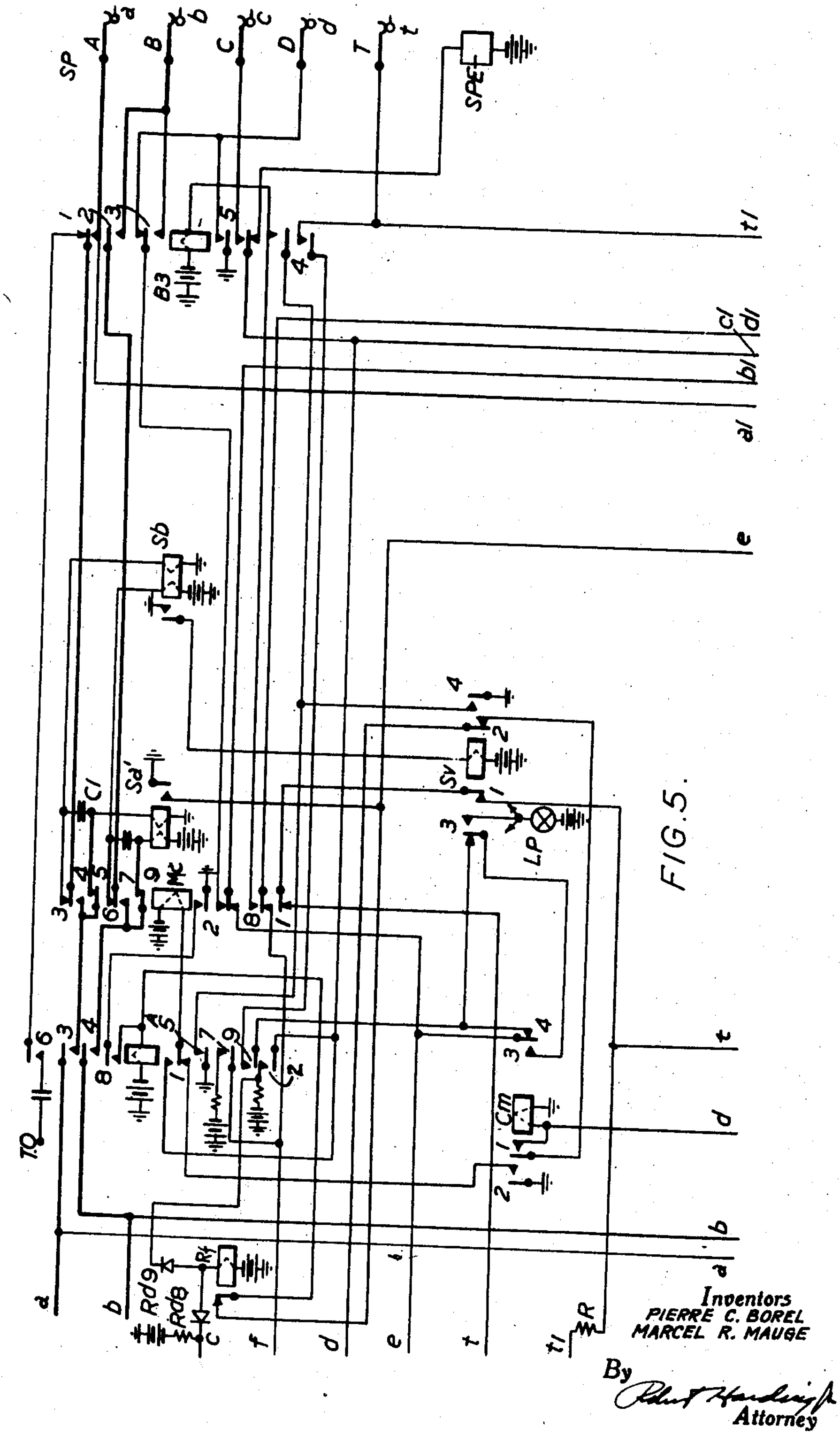
Figure 5 illustrates a connector circuit used in the present embodiment of the invention.

Referring to Figs. 3, 4 and 5, it will be seen that relay B by its operation closes the following circuit; battery, 250 ohm resistance, break down RJ, wire 1, busying device CO of line finder circuit (Fig. 4), break contact 5 of relay Ac, wire t towards the link circuit, break contact 1 of relay Mc (Fig. 5), break contact 1 of relay Sv, resistance R (Fig. 5), wire t1, wire 2 towards the starting circuit, winding of relay C (Fig. 3) and ground. This circuit is established only for free circuits.

As will be explained later, when a circuit is busy, the above described circuit is open by break contact 1 of relay Mc during selections, by break contact 5 of relay Ac or by break contact 1 of relay Sv after the selections.

Figure 8:
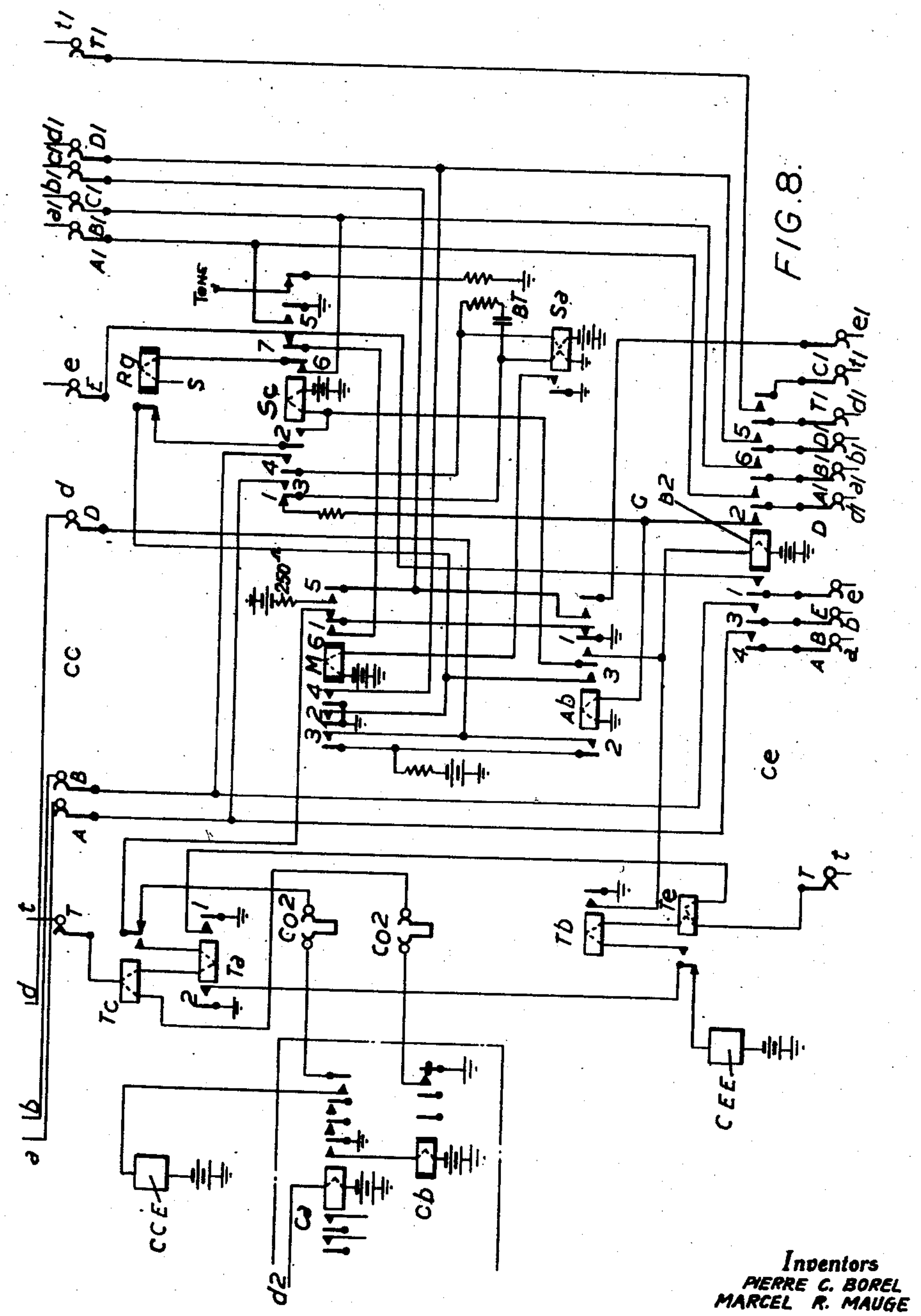
Figure 8 represents a junction circuit between the connector circuit and the register circuit.
Figures 2, 3, 4, 5, 8, 9:
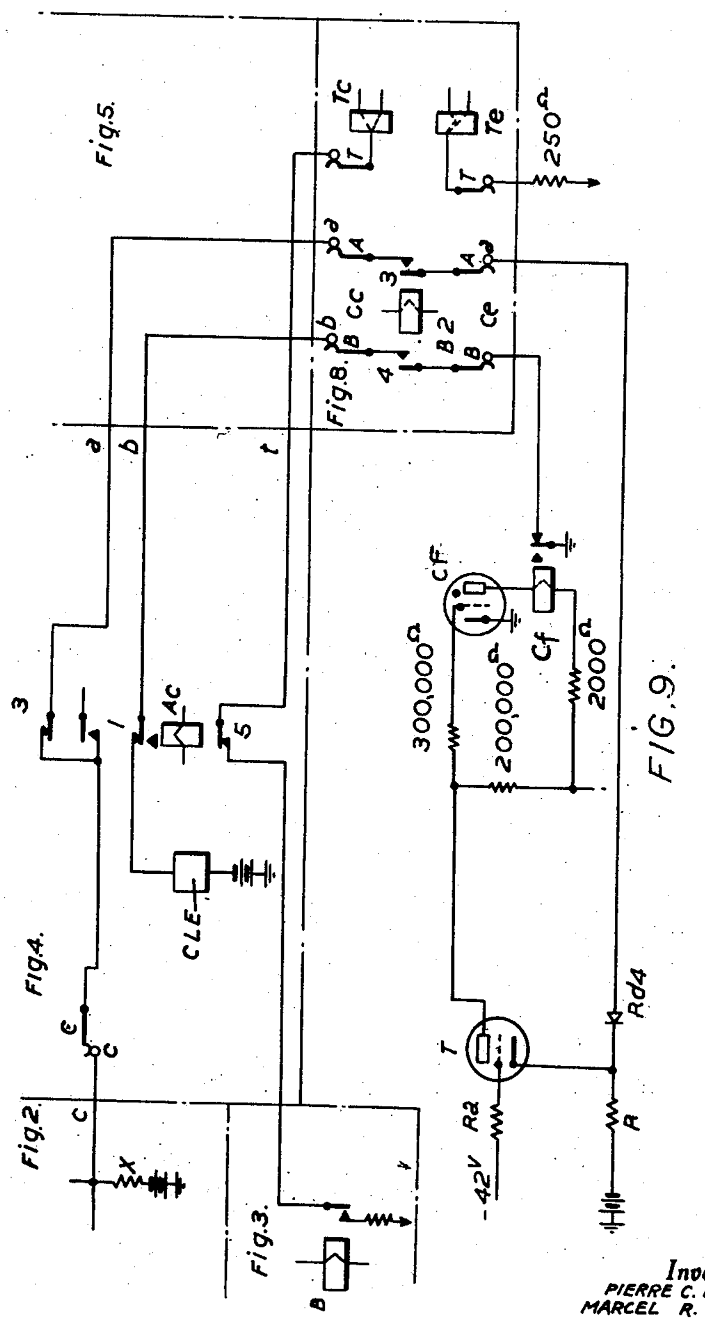
Figures 9 to 18 represent the various elemental portions of which the register circuit is composed for those portions of the register necessary to an understanding of the present embodiment of the invention.

If at least one line finder circuit is free, relay C of the starting circuit energises and by its make contact connects ground to one of the terminals of relay D which operates. Relay D by its make contact feeds relays *Ca*, *Cb* (Fig. 8). Relay *Ca* closes the clutch electro-magnet circuit of finder CCE of free link circuits by means of the following circuit: battery, electro-magnet CCE, make contact of relay *Ca*, busying device CO2, break contact of relay Tc, break contact 1 of relay M, break contact 1 of relay Ab, and ground. When finder CCE meets a free circuit in the line finder circuit group wanted by the starting circuit, the following circuit is established: battery, 250 ohm resistance, make contact of relay B, break contact of jack RJ, wire 1 (Fig. 5), busying device Co, break contact of relay Ac, wire *t*, break contact of relay Mc, break contact of relay Sv, wire t1, towards the link circuit (Fig. 8), brush T of finder CC, left hand winding of relay Tc, busying device Co1, make contact of relay *Cb* and ground. Relay Tc operates and opens the energisation circuit of the electro-magnet CCE of finder CC which stops. Relay *Cb* is slow to operate; electro-magnet CCE is thus fed before relay Tc can operate. This allows finder CC to move for each call, thus preventing any calling subscriber from holding the same circuit chain in periods of heavy traffic. Relay Tc, connects by its make contact, relay Ta in series with its right hand winding so as to verify whether or not a double test has been performed. Relay Ta operates if there was no double test and closes by its make contact 2, clutch electro-magnet CEE of finder CE. Finder CE then hunts for a free register circuit. When finder CE meets a free register circuit the following circuit is established: ground, make contact 1 of relay Ta, right hand winding of relay Te, brush T of finder CE, and wire *t*. Wire *t* is then at the availability potential of the register. This potential may be obtained by connecting wire *t* to the negative terminal of a 48 volt battery through a 250 ohm resistance, as represented in Fig. 9. Relay Te operates, opens the clutch electro-magnet circuit of finder CE and introduces winding of relay Tb in series with its left hand winding so as to verify if there was a double test. Relay Te after operating then introduces in the test circuit a low resistance through its left hand winding and relay Tb winding which causes a drop in the test potential, thus avoiding the seizure of this circuit by another link circuit. As has been explained in connection with Fig. 3, two circuit chains may be engaged to hunt for the calling line. When two link circuits are engaged relay C (Fig. 3) is shunted and released, relays D (Fig. 3) Ca and Cb (Fig. 8) release, stopping the hunting of other circuits of the group of which two may be engaged to hunt for the calling line. During this hunting process the link circuit is maintained by relays Tc and Ta. If the subscriber hangs up, relay B (Fig. 3) releases, relays Tc and Ta then release, releasing the busy link circuit. Relay Tb by its make contact closes the energisation circuit of relay B2. This relay by its make contact connects the line finder circuit to the register which will then control the forward movement of the line finder CL (Fig. 4) hunting for the calling line.

The circuits used for hunting for the calling line have been represented in Fig. 9. Referring to this figure, it will be seen that the clutch electro-magnet CLE of line finder CL is connected in the register to a ground by means of a break contact of relay Cf. Brush C scans brushes c of the line finder circuits (Fig. 4). This brush is connected to the negative terminal of a 48 volt battery by means of the following circuit: break contact 3 of relay Ac (Fig. 4), wire a, terminal a, brush A of finder CC, make contact 4 of relay B2, brush A of finder CE, terminal a (Fig. 8), rectifying cell RD4, resistance R, and negative terminal of the 48 volt battery (Fig. 9). Relay Cf is placed under control of a cold cathode tube CF the biasing of which is controlled by triode T. The grid of triode T is connected through resistance Ra to such a potential that the triode ceases to be conductive when the line finder meets a calling line, i. e. when the cathode potential becomes positive with respect to the grid potential due to the current flow in resistance R. In the embodiment, the triode grid potential is maintained at −42 volts and resistance R is of 10,000 ohms. When the line finder meets a calling line, the plate current is suppressed and the control anode of cold cathode tube CF is brought to the potential of the high tension source. Cold cathode tube CF ionises and a current flows in the winding of relay Cf which energises and stops the hunting for the line finder.

For testing circuits which do not include cut-off relays, resistance X between wire C and the negative terminal of the 48 volt battery (Fig. 9) is measured. In order to avoid faults caused by resistance R during a line test for a calling line, the rectifying cell Rd4 is connected in series with resistance R so that the source of potential connected to resistance R cannot interfere with potential readings made by a register on a wanted line.

Figure 10:
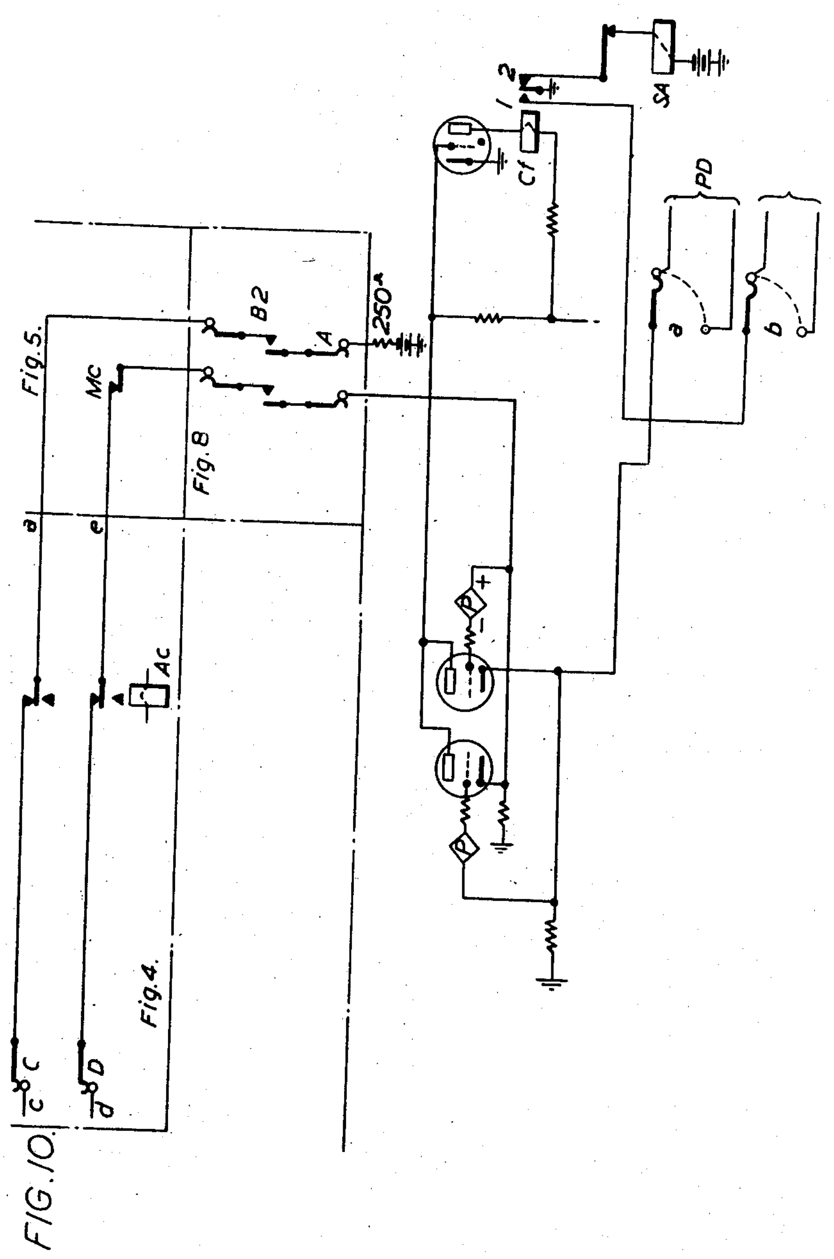

When finder CL meets the wanted line, the register, by switching means (which are well known in the art and therefore not shown) connects wire a to the negative terminal of a 48 volt battery through a low resistance, i. e. of 250 ohms (Fig. 10). Wire a of the register is then connected to wire C of the line, the potential of this wire falls to about −48 volts, which causes on the one hand the release of relay A (Fig. 3) and on the other hand acts to prevent the stopping of another line finder.

It is then necessary that the register identify the characteristic or characteristics of the line so as to be able to control the impulse registering and also to avoid certain calls if the line is a restricted service line. Wire d is connected from the line circuit to sources of characteristic potential. In the embodiment considered these characteristic potentials are: 0 volt (ground) for lines used for absentee subscribers, −48 volts for restricted service lines provided with conventional call senders, −46 volts for restricted service lines provided with fast call senders, −44 volts for restricted service lines the station of which are provided with keyboards, −42 volts for stations provided with a special limitation class and for subscriber stations provided with conventional call dials. In the more common case i. e. when the lines are without limitation, and the subscriber's station is provided with a conventional call dial, there is no connection on wire d.

To recognize the calling line characteristic the register utilises a potential comparing device comprising a double triode, a cold cathode tube and one relay as represented in Fig. 10. The inter-connection of these elements so as to function as comparing devices is well known in the art. In series with the triode grids there is shown the biasing elements P which may consist of four rectifying cells mounted in bridge relation. These biasing elements assume a change of grid potential so that the plate current is suppressed when the grid potential is identical to that of the cathode. Referring to Fig. 10, it will be seen that a step-by-step switch SA, provided with two rows of contacts a and b is used to apply to the comparing device the different characteristic potentials. Relay Cf through its break contact 2 controls the operation of step-by-step switch SA. At the beginning of the test of the potential of wire d, step-by-step switch SA is on its normal position and the brush of row a is not connected to any potential. If the calling line does not possess any special characteristics, wire d of its line circuit is not connected to any potential, the two triodes then cease to be conductive and relay Cf operates and prevents the operation of step-by-step switch SA. If wire d is at a certain potential, relay Cf remains at rest, step-by-step switch SA advances and successively offers the different potentials PD capable of being presented on wire d to the input of the comparing device. When the potential corresponding to that of wire d is offered by step-by-step switch SA, the relay operates, stops the stepping of the step-by-step switch SA, which is then in a position corresponding to the class of the calling subscriber. Through its make contact 1, relay Cf connects a ground to brush b of step-by-step switch SA. The different terminals of row b of the step-by-step switch SA are connected to switching devices well known in the art, such as relays, said switching devices being connected to complete the connections necessary to the registering of the calling subscriber class. These devices are controlled by ground connected through make contact of relay Cf to brush b by step-by-step switch SA.

Figure 11:
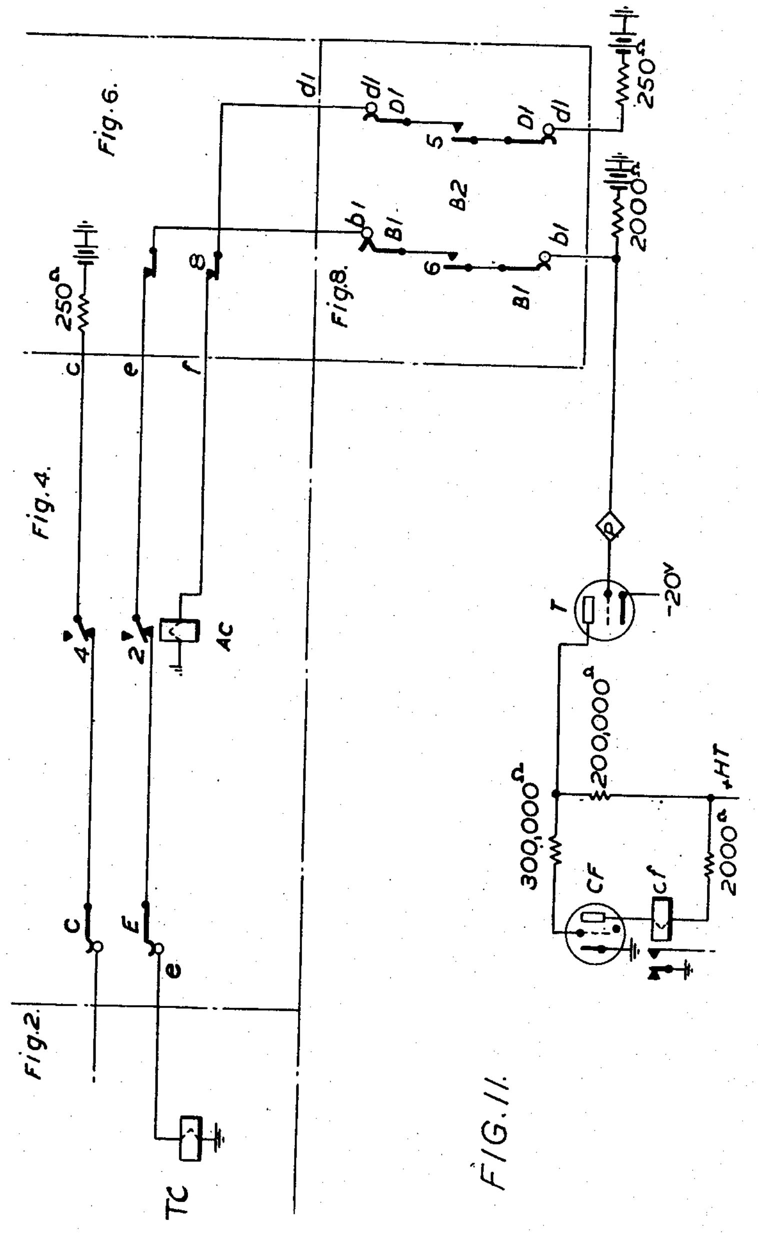

After the test and the registering of the calling subscriber class, the register causes the operation of relay Ac (Fig. 4). Referring to Fig. 11, it will be seen that relay Ac energises when the register connects the negative terminal of a 48 volt battery to wire f (Fig. 4) by means of the following circuit: ground, winding of relay Ac, wire f (Fig. 4), break contact 8 of relay Mc (Fig. 5), terminal d1 (Fig. 8), terminal D1 of CC, make contact 5 of relay B2, terminal D1 of finder CE, wire d1, 250 ohm resistance and negative terminal of a 48 volt battery. Relay Ac connects, through its make contact 4, a battery on wire c of the calling line so as to maintain this line busy, and transfers the wire b1 of the register from brush D to brush E of line finder CL.

Brush E of line finder is connected to communication meter TC of the calling line so that the register can ascertain whether or not the line has not been seized by one or more other circuits. To verify if there has been a double connection, the register connects the winding of recorder TC, to a negative terminal of a 48 volt battery through a resistance (2,000 ohms in the present embodiment), and then reads the potential appearing across the terminals of this resistance. In the present embodiment, the winding of the meter has about 1,000 ohms resistance and the resistance closing the circuit is very close to 2,000 ohms, with the supply battery being of 48 volts. The potential difference at the terminals of the winding of said meter is 16 volts if the connection is a simple one, and 24 volts in case of a double connection, thus the register may determine whether the potential drop is 16 or 24 volts. To make this verification, the grid of a triode T is connected to the winding of the meter through the biasing device P, while the cathode is connected to the negative terminal of a 20 volt battery. If the connection is a simple one, the grid potential (—16 volts) is positive with respect to the cathode potential and the triode remains conductive; on the contrary if there is a double connection, or if this connection is multiple, the grid potential (—24 volts) is negative with respect to the cathode potential and the triode ceases to be conductive. This device is used, as is well known, in combination with a cold cathode tube CF in the anode circuit of which a relay Cf is connected in series. Cold cathode tube CF ionises and relay Cf energises when the triode is not conductive. Operation of relay Cf causes the release of the register as well as of the busy circuit chain by means not described but which are well known in the art.

After these tests, the calling line is connected in the register to devices adapted to indicate to the subscriber that he can send impulse groups characteristic of the called subscriber. These impulse may eventually be tranlated so as to control the selections necessary to reach the called subscriber. Such devices are well known of those skilled in the art and have not been shown.

Figure 12:
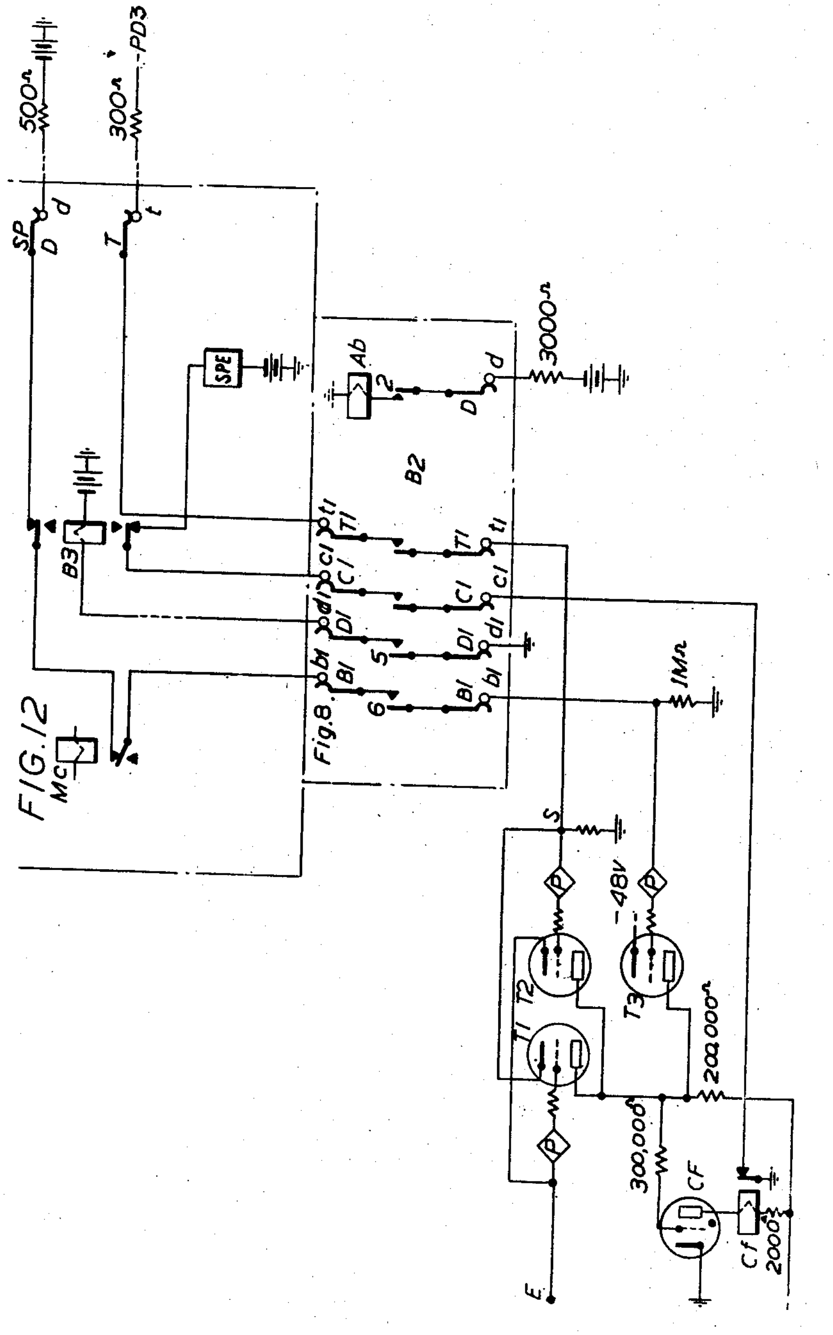

Referring to Figures 4, 5, 8 and 12 it will be seen that the calling line is connected to the register by means of wires a and b, and hence it is the register which controls the call and which responds to a prematurate release of the subscriber. To maintain the circuits engaged, the register connects (Fig. 12) a battery on wire d (Fig. 8) through a resistance of about 3,000 ohms. Relay Ab (Fig. 8) is then operated and closes the holding circuit of relay B2 which has previously been operated during the register test. Relay Ab on the other hand closes the energisation circuit of relay Cm (Fig. 5) by means of the following circuit: battery, 250 ohm resistance, make contact 2 of relay Ab, brush D, terminal of finder CC, wire d, winding of relay Cm and ground. By its make contact 1, relay Cm connects relay Ac (Fig. 4) in parallel with its winding, by means of the following circuit: wire d, make contact 1 of relay Cm, break contact 2 of relay Sv, wire d, make contact 6 of relay Ac, winding of relay Ac, and ground, thus maintaining Ac operated. Relay Cm operated, closes the energisation circuit of relay Mc: ground, make contact 2 of relay Cm; break contact 1 of relay A, winding of relay Mc and battery. Relay Mc on operating connects the wires which are no longer used for the calling line hunting and which will be utilised for establishing selections. Referring to Fig. 12 it will be seen that brushes D and T as well as the clutch electro-magnet SPE of the primary selector are connected to the register. Brushes D and T control the running of the primary selector, brush D scans the terminals carrying the potentials characteristic of the circuit availability, and brush T scans the terminals carrying the potentials PD1 characteristic of the selection levels. To control the selection, the register has to verify two characteristics, one level characteristic on brush T and one availability characteristic on brush D. To control these two characteristics simultaneously we use on the one hand a potential comparing device well known in the art to recognise levels, and on the other hand a triode to recognise availabilities. As will be seen in Fig. 12, the plates of three triodes T1, T2 and T3 are connected to the control circuit of the cold cathode tube CF.

When none of the three triodes produce current, the high tension potential is applied to the control electrode of cold cathode tube CF which ionises and energises relay Cf, which on operating, opens the energisation circuit of the starting electro-magnet SPE of the primary selector. It is well known that the input E of the comparing potential device has been connected to a potential corresponding to the desired level. Means utilised to bring terminal E to the desired potential are well known in the art and have not been represented. Brush T of the primary selector is connected to point S of the comparing device. The comparing device will not cease to be conductive until the potential of points E and S are identical and this can only be true when brush T meets one terminal corresponding to the level by which the call has to be served. Brush D of the primary selector is connected to ground through a high resistance, e. g. 1 megohm. The grid of triode T3 is connected to brush D through biasing device P. The cathode of this triode is connected to the negative terminal of 48 bolts. When brush D is on a disconnected terminal, or between two terminals, the potential of the triode grid (0 volt) is positive with respect to the cathode potential, triode T3 remains conductive and the potential drop across the 200,000 ohm resistance opposes the ionisation of the cold cathode tube CF. This occurs in the same manner when brush D reaches a terminal corresponding to a busy circuit. It will be seen later that in this case, wire d of the corresponding circuit is connected to ground through a low value resistance. When brush D meets a free circuit, wire d is connected to the negative terminal of a 48 volt battery through a 500 ohm resistance, the grid potential of triode T3 is —48 volts, i. e. the same potential as the cathode. Due to the grid voltage variation provided by the biasing device P, the plate-current is suppressed. The primary selector SP stops only when it has met a free circuit of the desired level.

Figure 6:
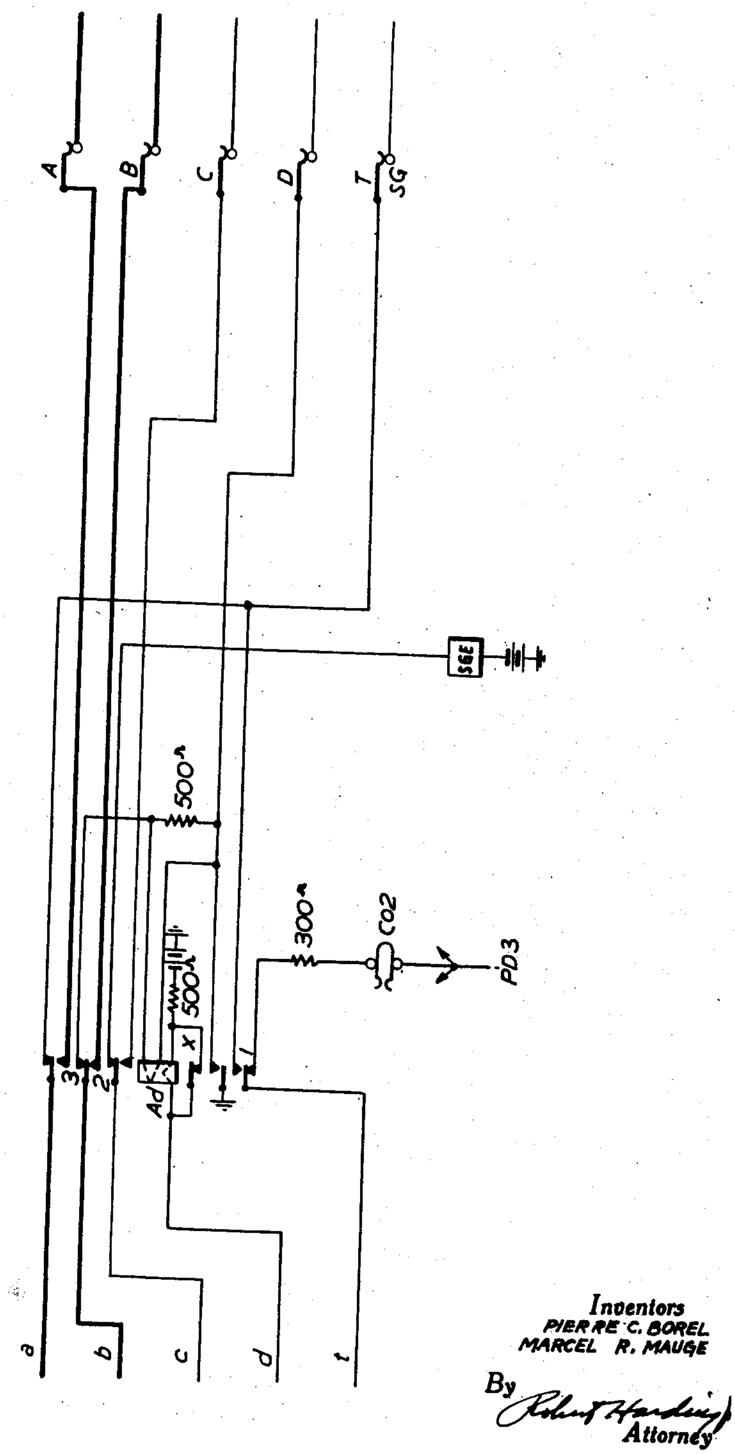
Figure 6 illustrates a group selector circuit.

Referring to Fig. 6, it will be seen that when relay Ad is at rest, the potential characteristic of the level is transmitted to wire t from the characteristic potential distributor PD3 (not shown), through busy device Co2, a 300 ohm resistance and break contact 1 of relay Ad. The availability potential on wire d is taken from a 48 volt battery, through a 500 ohm resistance and break contact $x$ of relay $Ad$. The 300 and 500 ohm resistances are protecting resistances which may have values different from those indicated on Fig. 6.

After the stopping of primary selector SP, the register begins a test to verify the double test. This test will be described later. If there is a double test, the hunting starts again. If not, the register provides for the operation of relay B3 (Fig. 5) by connecting a ground on wire $d1$.

Figure 13:
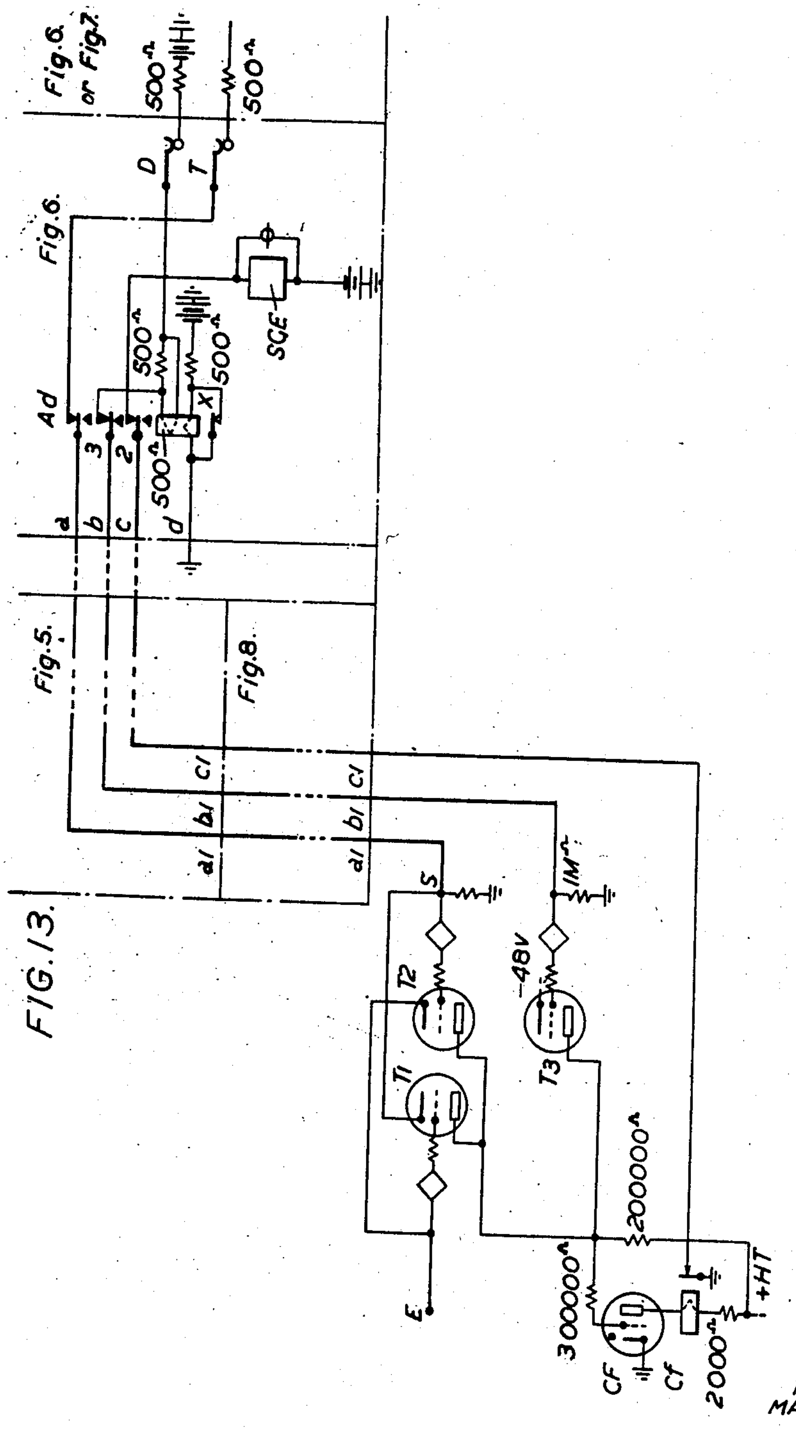

The switching means utilised to connect a ground on wire $d1$ ae well known and have not been described. Relay B3 (Fig. 5) connects a ground on brush D of the primary selector so as to characterise the engaged circuit busying condition (contact 5 of B3). The circuit condition after operation of relay B3 is shown in Fig. 13. Wires $a$, $b$, and $c$ of the group selector SG are connected to the register. Fig. 13 gives details of the switching devices which, under control of the register, control the group selector SG. The different parts of the register are the same as those utilised to control the primary selector and will be indicated by the same references. The input E of the potential comparing device is maintained at a potential corresponding to the level desired for the selection. The clutch electro-magnet SGE of group selector SG is connected to the register by wire $c$. Brush D scans the terminals carrying the potential characteristic of the desired circuit availability or busy condition of the circuit hunted for. It is connected to the register by means of wire $b$ through winding of relay $Ad$ shunted by a 500 ohm resistance (Fig. 6)

The operation of the device controlling the group selector is the same as that described for the control of primary selector SP. Relay $Cf$ operates only when the group selector reaches a free circuit in the desired level, relay $Cf$ then opens the clutch electro-magnet SGE circuit.

Figure 14:
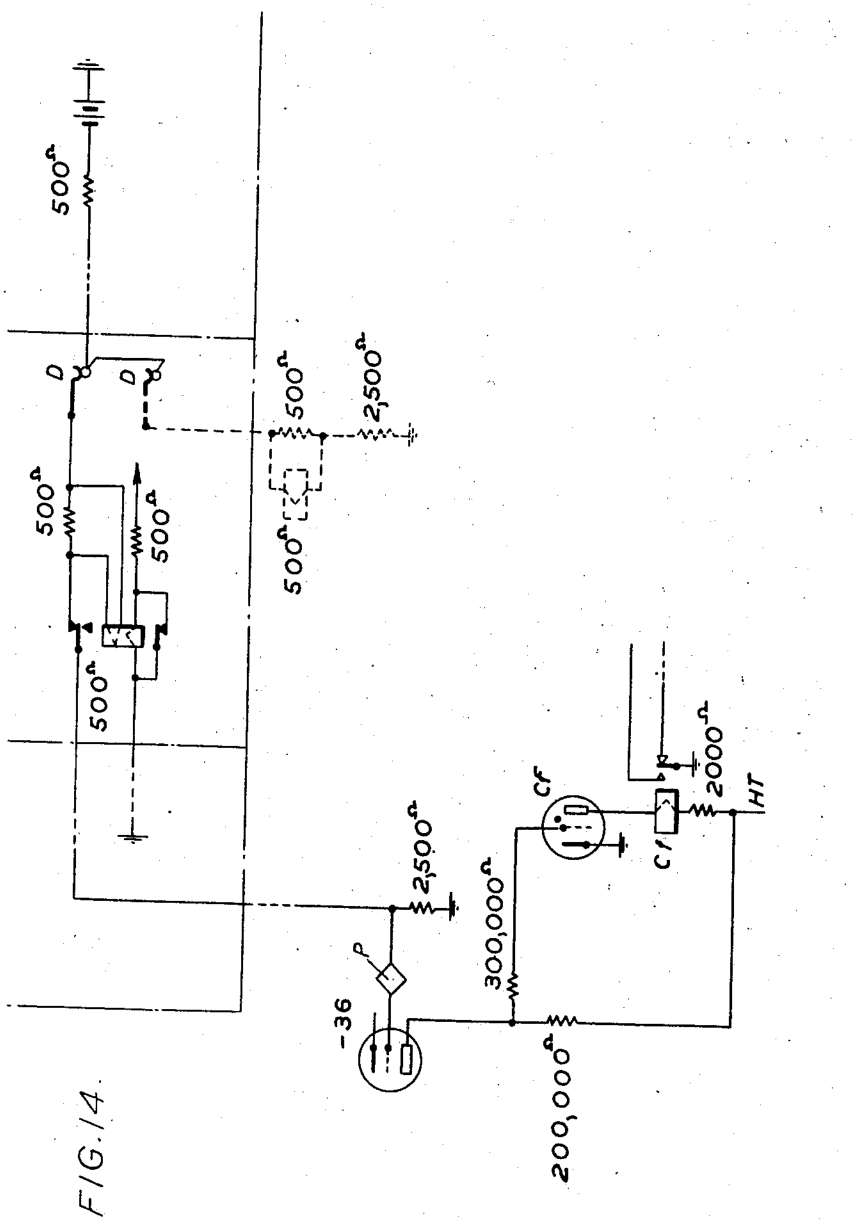
Figure 15:
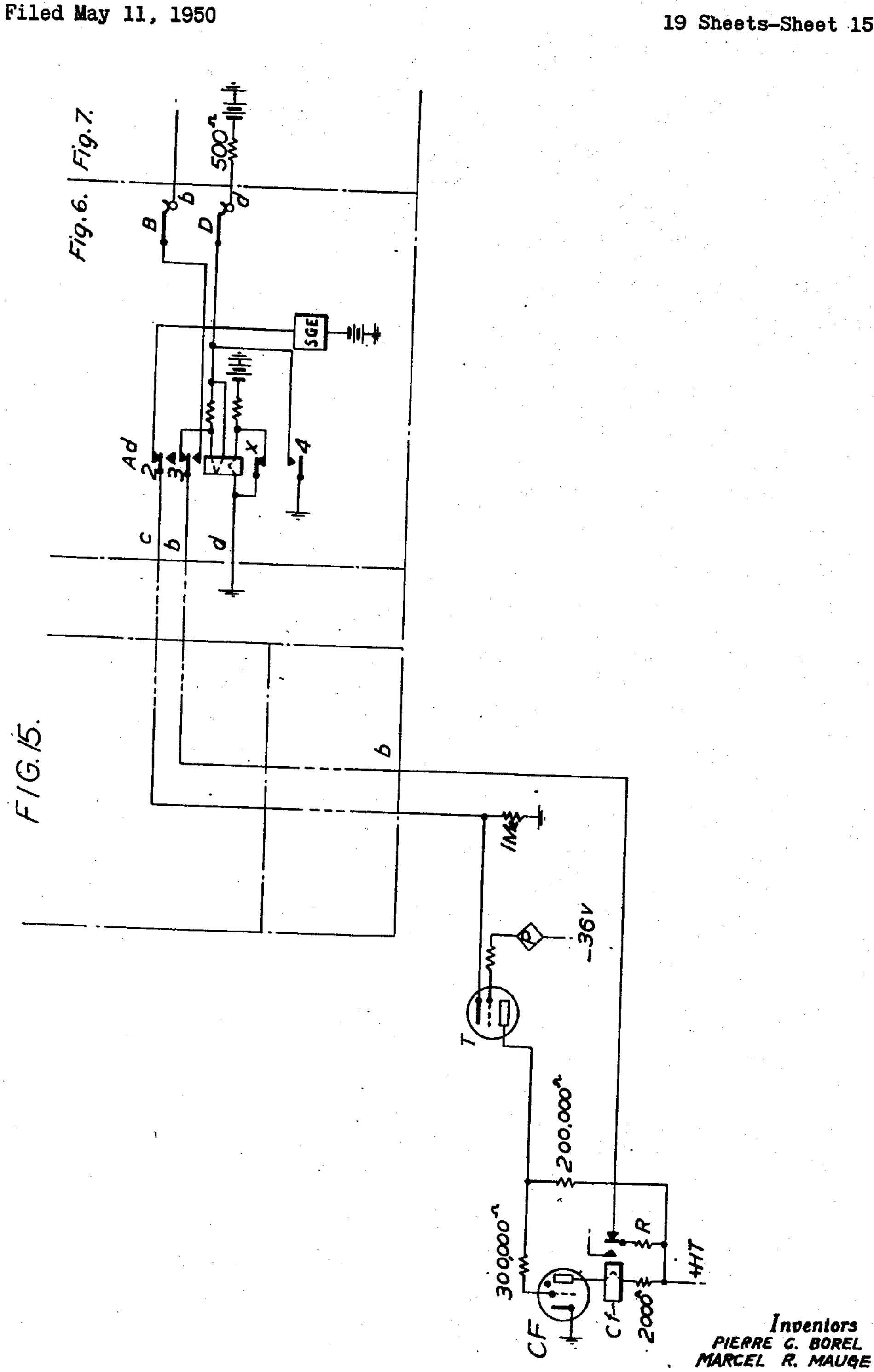

As has been described above, the register, after meeting a free circuit, has to determine if the said circuit has been seized by another register (double test). Fig. 14 represents the circuit for verifying if the double test has taken place. The switching means utilised to establish this circuit are well known in the art and have not been represented. During the hunting a one megohm resistance is connected between brush D and ground. During the double test verification, this resistance is replaced by a 2,500 ohm resistance. In the case of a double connection, the grid potential of the triode connected between the 2,500 ohm resistance and brush D is raised. The cathode of the triode is biased so that the grid potential remains negative with respect to the cathode potential, if the connection is a simple one and if a double connection the grid potential becomes positive with respect to the cathode potential. The triode ceases to be conductive in case of a simple connection and relay $Cf$ operates indicating to the register that the circuit can be engaged. Relay $Cf$ remains at rest in the case of a double connection and the hunting operation is again started. On operating, relay $Cf$ controls the switching device in the register which modifies the circuit as represented in Fig. 15. This figure shows the operation control of relay $Ad$ of the group selector of Fig. 6.

Relay $Cf$, on operating, controls switching means in the register which modifies the circuit to bring it to the condition as represented in Fig. 15. As the group selector circuits are identical, the energisation of relay $Ad$ of Fig. 6 may wrongly cause the operation of relay $Ad$ of the group selector which has just been engaged. To assure the operation of only the desired relay, it is provided that the energisation circuit of this relay is controlled by an electronic device capable of opening the energisation circuit of relay $Ad$, of the second group selector before the energisation of relay $Ad$ of Figure 6. The device uses a cold cathode tube CF and a relay $Cf$ mounted in the anode circuit of the said tube. It is known that relay $Cf$ operates less than three milli-seconds after the operating conditions have been reached in the cold cathode tube. The cathode of the triode T is connected to the wire $c$ and break contact 2 of relay $Ad$ (Fig. 6) to the clutch electro-magnet of the group selector, and also to ground through a 1 megohm resistance. The triode grid is connected to the negative terminal of a 36 volt battery. It is therefore positive with respect to the cathode potential which is very near −48 volts. In these conditions, the triode is conductive and opposes the ionisation of cold cathode tube CF. On the other hand, relay $Ad$ (Fig. 6) energises by means of the following circuit: positive terminal of the high tension battery, resistance R, break contact of relay $Cf$, wire $b$, break contact 3 of relay $Ad$ (Fig. 6) winding of relay $Ad$ in parallel with a 500 ohm resistance, brush D, wire $d$, 500 ohm resistance of the engaged group selector, break contact of said selector, and battery of the circuit which has just been engaged. Relay $Ad$ energises and by its make contact $x$ introduces the low winding in series with a 500 ohm resistance in a battery circuit. Relay $d$ is arranged such that contact $x$ opens before all the other contacts of the relay so that the energisation circuit of relay $Ad$, using its low winding, is closed before the energisation circuit using the upper winding is opened. Relay $Ad$ thus is locked by its make contact $x$. It opens by its make contact 2 the energisation circuit of clutch electro-magnet SGE. The cathode potential of triode T increases from −48 volts to 0 volt, the triode T plate current ceases, the potential of the high tension battery is then applied to the control electrode of the cold cathode tube CF which ionises and enables the energisation of relay $Cf$ which opens the energisation circuit of relay $d$ by means of its upper winding. When make contact 3 is established, it extends wire $b$ (Fig. 6) to brush B of the group selector SG. The high potential is no longer connected on wire $b$ due to the operation of relay $Cf$. Consequently relay $Ad$ of the following circuit cannot operate. On the other hand, relay $Ad$ connects by its make contact 4, a ground on wire $d$ so as to busy this circuit.

The final selector circuit (Fig. 7) is different from the group selector circuit. Relay $Af$ operates when wire $d$ is connected to ground for the group selector which has engaged the final selector circuit. Relay $Af$ connects the test brush T of the final selector SF to wire $a$ by its make contact 1, and connects the clutch electro-magnet SFE of the final selector SF to wire $c$ by its make contact 2. Wires $a$ and $b$ are connected to the register which controls the selection of the tens numbers and the selection of the unit digits by comparing potentials, as is well known in the art. Wires $b$ and $t$ are also connected to the register as is readily seen from Figs. 7, 6, 5 and 8. When the final selector reaches the subscriber's line corresponding to the registered numbers, it is necessary that the register verifies the characteristic carried on wire *d* of the called line to derive therefrom the category to which this line belongs.

When the final selector SF has reached the direction corresponding to the called subscriber, the register operates relay B4 by connecting a ground on wire *t*. Relay B4 by its make contact 1, disconnects brush T of the final selector SF from wire *a* and connects wire *a* on brush D. Relay B4 by its make contact 2 also opens the energisation circuit of relay A*f* which nevertheless remains operated by means of the following circuit: battery, lower winding, make contact 3 of relay A*f* and ground on wire *t* in the register. The clutch electromagnet SFE is always under control of the register through make contact 2 of relay A*f* and of wire *c*. On the other hand, wire *c* of the called subscriber line circuit is connected to the register through brush C of the final selector SF and of make contact 4 of relay A*f* and wire *b*. The register thus may verify conditions of the line as well as its characteristic and eventually direct the call towards another line, as for instance in case of a hunting amongst grouped lines. The operation of relay B4 under control of the register has not been described in detail but it may readily be seen (Fig. 16) that the register operates a relay F*s* which connects a ground on wire *t*. The dotted line (Fig. 16) shows that relay F*s* has no direct access to the final selector but has access to it through the different circuits previously engaged, as the different group selectors connect the circuit input wire *t* to the output wire *t* after operation of relay A*d*. The details of the selection of grouped lines and for special characterised lines is well known and has not been described.

Figure 7:
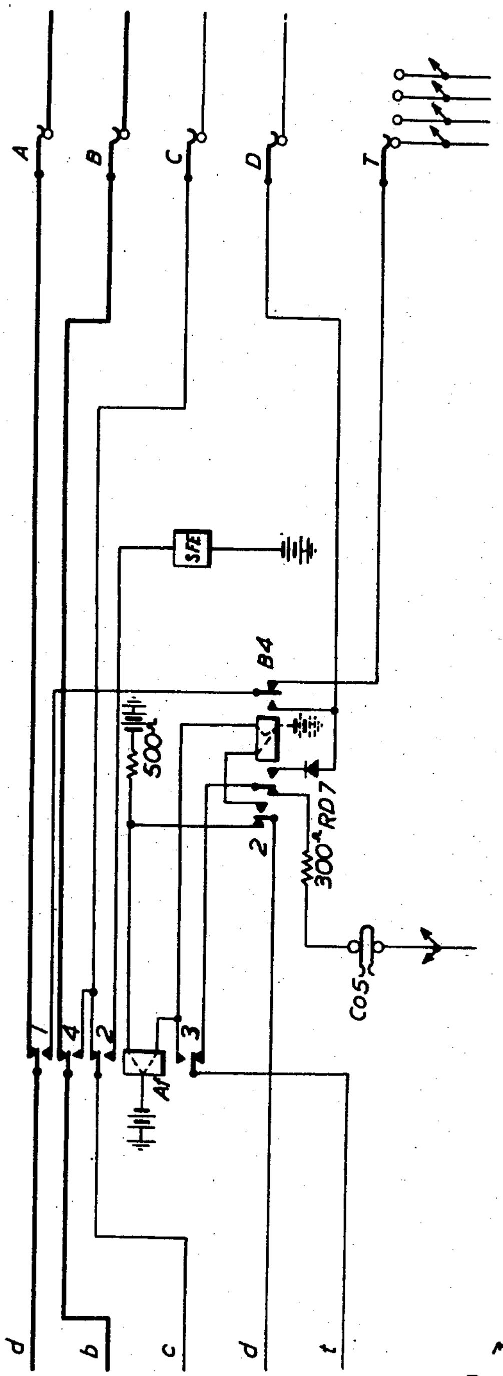
Figure 7 illustrates a final selector circuit.
Figure 16:
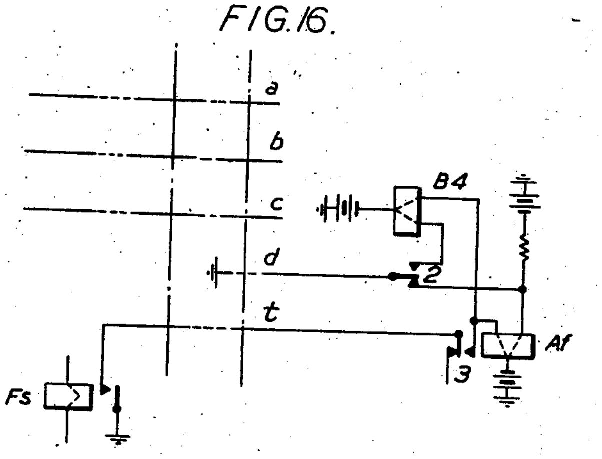

At the end of the selection, the energisation circuit of relay F*s* is opened by the register, ground is thus disconnected from wire *t* and relay A (Figs. 7 and 16) releases; relay B4 remains blocked by ground on wire *d* (Figs. 7 and 16). Relay A*f* by releasing connects wires *a*, *b*, *c* of the subscriber line to the input wires *a*, *b*, *c* of the final selector circuit.

Figure 17:
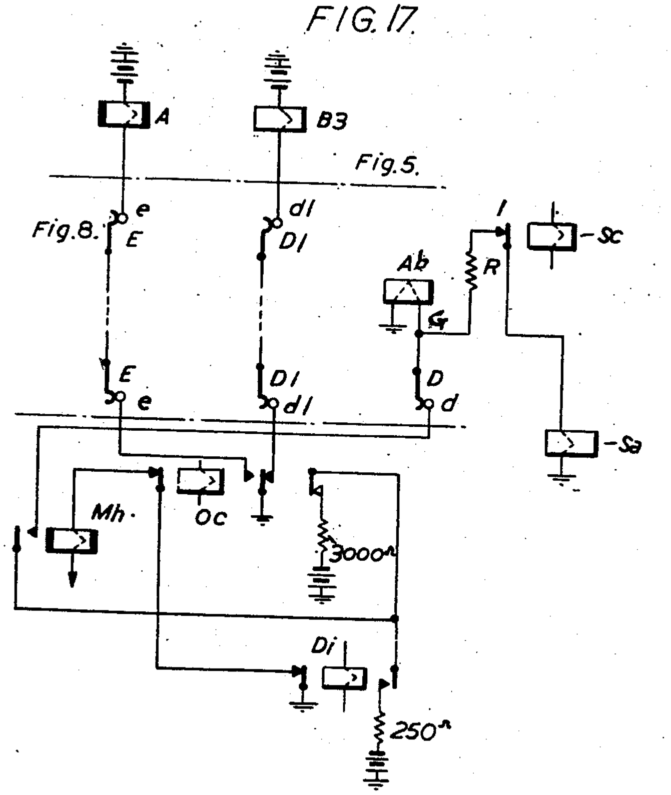

Referring to Fig. 17 it will be seen that left hand winding of relay S*a* is connected in parallel with winding of relay A*b* through a resistance R; point G of the preceding circuit is connected to a battery through a 3,000 ohm resistance which causes the energisation of relay A*b* but cannot cause the energisation of relay S*a* due to resistance R.

At the end of the selections if the line is busy the register operates relay O*c* (Fig. 17) which on operating opens the circuit of relay B3 (Fig. 5) and connects a ground on the energisation circuit of relay A. Relay A (Fig. 5) by opening its break contact 1 opens the energisation circuit of relay M*c* which releases, and by its make contacts 3 and 4, connects relay S*a* on the calling line. Relay S*a* energises and closes a holding circuit of relay A. On the other hand, relay O*c* by opening its left hand break contact opens the circuit of relay M*h* which releases and opens the energistation circuit of relay A*b* (Fig. 8) which releases the link circuit. The busying tone is then sent to the calling subscriber by make contact 6 of relay A and break contact 1 of relay B3, break contact 3 of relay M*c* and condenser C1. Releasing of relay A*b* releases relay B2 (Fig. 8) which in turn releases the register circuit which then becomes free for another call.

If the line is free, relay D*i* (Fig. 17) operates.

Relay D*i* connects a battery on wire *d* through a 250 ohm resistance. Relay S*a* (Fig. 8) energises by means of the following circuit: ground, left hand winding of relay S*a*, break contact 1 of relay S*c*, resistance R, make contact 2 of relay B2, brush D and terminal *d* of finder CE, make contact of relay M*h* (Fig. 17), make contact of relay D*i*, 250 ohm resistance, and battery. Relay S*a* closes the energisation circuit of relay M which by its break contact 2 completes the energisation circuit of relay S*c*, which has been prepared by make contact 3 of relay A*b*, relay S*c* is locked by its make contact 2 and break contact of R*g*. By its make contacts 3 and 4 relay S*c* connects relay S*a* on the calling line; relay S*a* energises in series through the loop of the calling subscriber station. Relay M by its make contact 3 closes a holding circuit of relay C*m* (Fig. 5), by its make contact 4 closes a holding circuit by relay B3 (Fig. 5) and by its make contact 5 closes a busying circuit of the called line. The busying circuit is extended through the different selectors on wire *c* of the called line so as to keep the busying characteristic on this line. Relay S*c* connects a ground on brush A1 of finder CC by means of its make contact 5 and connects by its make contact 6 the ringing current source connected in S through the winding of relay R*g*, to brush B1 of finder CC. These brushes are connected to wires *a* and *b* of the called line through the different selectors. The called subscriber is then signalled while the ringing tone is transmitted to the calling subscriber by means of transformer BT.

Referring to Fig. 17 it will be seen that the register remains seized by means of relay M*h* the energisation circuit of which is opened either after operation of relay D*i* if the line is free, or after operation of relay O*c* if the line is busy. After releasing of relay M*h*, the circuit of relay A*b* (Fig. 8) is opened as well as the energisation circuit of relay B2. All the wires connected to the register are disconnected by releasing of relays A*b* and B2. The ringing tone is thus transmitted to the called subscriber without being held busy. When the called subscriber closes its line circuit by unhooking its receiver relay R*g* operates and opens the locking circuit of relay S*c* (Fig. 8) which suppresses the ringing tone and disconnects relay S*a* from the calling line. Relay S*c* on the other hand energises relay A (Fig. 5) by means of the following circuit: ground, break contact 1 of relay A*b*, make contact 6 of relay M, break contact 7 of relay S*c*, brush E, terminal *e* of finder CC, break contact of relay R*f*, winding of relay A and battery. Relay A (Fig. 5) on operating, connects relay S*a'* on the calling line and this relay keeps relay A operated. By its make contact 5, relay A closes the locking circuit of relay B3 and by its make contact 7 it locks relay C*m* and keeps operated relay A*c* (Fig. 4). By its make contact 2 it connects a battery on brush C of the selector SP. This brush is connected to wire *c* of the called line and the battery which is connected thereto gives the busying characteristic of the line. Relay M*c* releases. Referring to Fig. 8 it will be seen that relay M slowly releases after releasing of relay S*a* and after releasing of relay M, the link circuit (Fig. 8) is freed. Referring to Fig. 5 it will be seen that relay 8*b* is connected by make contacts 1 and 2 of relay B3 on wires of the called line so as to feed the corresponding substation and provide for the supervision. Relay S*b* closes the energisation circuit of relay S*v* which closes the energisation circuit of the calling line meter: battery, protection lamp P, make contact 3 of relay Sv, make contact 3 of relay Cm, wire e, make contact 2 of relay Ac (Fig. 4), brush E of line finder CL, winding of meter TC (Fig. 2) and ground. Furthermore, by opening its break contact 2 relay Sv opens the locking circuit of relay Cm which slowly releases thus opening the meter circuit. After the release of relay Cm, the calling line meter is connected to brush T of finder SP by means of the following circuit: wire e (Fig. 5), break contact 4 of relay Cm, make contact 9 of relay A, make contact 4 of relay B3, brush T and wire t. Referring to Figs. 6 and 7 which respectively represent a group selector circuit or a final selector circuit, it will be seen that the meter wire of the calling line is extended through the different circuits by wire t to rectifier Rd7 (Fig. 7) on wire d of the called line. This circuit is used to identify the calling subscriber. Wire d of the called line can be connected to characteristic potentials of lines having special functions, such as head of group lines or supplementary lines. The direction of the rectifier RD7 is such that it is opposed to the flow of meter energisation current towards brush D and that on the contrary if calling subscriber identification is necessary the signalling current can be obtained by current sources placed in such a manner that the current flows from these sources towards the meter through the called line. The meter connection on brush T of selector SP also enables the multiple metering of call duration under control of outgoing junction circuits.

If the call is sent towards a subscriber connected to another exchange of the same network or of a distant network, it is evident that the called sub-station tone is not provided by the link circuit as has been previously described. In this case, relay A (Fig. 5) maintains the locking circuit of relay B3 and the circuit operates as has been previously described.

When the calling subscriber hangs up his handset, relay Sa' (Fig. 5) releases and opens the circuit of relay A which releases the calling line. If the called subscriber is still on the line, relay Sv, by its make contact 4, maintains relay B3 energized which, by its make contact 5 maintains the engaged circuit to avoid seizure by a link circuit.

Figure 18:
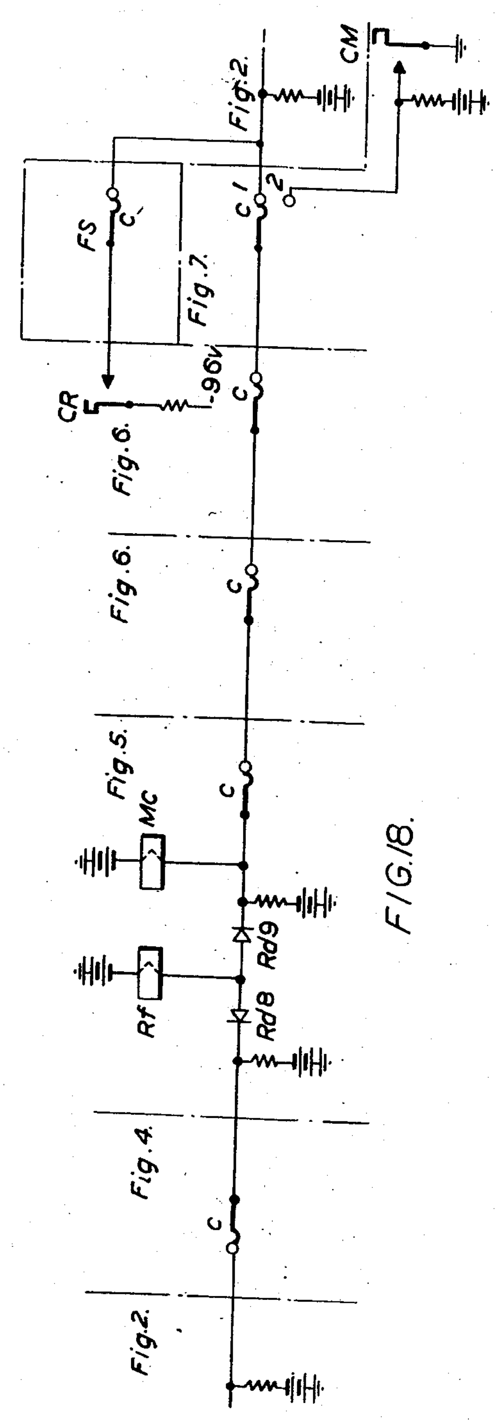

In Fig. 18 connections between wire c of the calling line and wire c of the called line have been shown. Wire c of the calling line is connected to the connection circuit (Fig. 5) by means of brush C of the line finder (Fig. 4). Wire c of the called line is connected to the connection circuit (link-circuit) (Fig. 5) by means of brush C of final selector (Fig. 7), brushes C of group selectors (Fig. 6); brush C. of primary selector (Fig. 5). The contacts of the relays which provides for the uninterrupted connection between wire c of the called line and brush C of the primary selector have not been represented. In the portion of Fig. 18 showing the final selector (Fig. 7), position 1 represents an ordinary line and position 2 a line allocated to a special service.

If a connection established between two subscribers must be broken e. g. if one of the subscribers must be freed to give him a preferential communication, another final selector is connected to the line to be released. Brush C of this selector FS gives access to wire c of the line under consideration. To free the called line, a potential negative with respect to the feeding potential (—48 volts) is connected on wire c of the line under consideration by means of brush C of final selector FS and the make contact of a breaking key CR. A current is thus established through relay Rf (Fig. 5), of the connection circuit (link-circuit) by means of the following circuit: negative terminal of a 48 volt battery, winding of relay Rf, rectifying cell of Rd9, brushes and terminal C of primary selector, of group selectors and of final selector, brush 1, wire c, brush and terminal of the final selector SF, key CR, and negative terminal of a 96 volt battery. Relay Rf operates and by opening its break contact releases relay A (Fig. 5), which disconnects the called line.

To render the calling line free, a circuit identical to the preceding is established but through a rectifier Rd8.

When the called line is a special service line and it is necessary for this service to directly reach the calling line wires, either to transmit the ringing current to the calling subscriber, or to connect to a special transmission bridge, the key CM is used to connect a ground on wire c so as to cause the operation of relay Mc (Fig. 18). Relay Rf remains at rest due to the rectifying cell RD9 which is opposed to the flow of current. Referring to Fig. 5 it will be seen that relay Mc directly connects wires a and b of the calling line on brushes A and B of the primary selector, by its contacts 4 and 7, brushes A and B of the primary selector are directly connected to wires a and b of the special service, relay Mc disconnects the transmission bridge by means of its contacts 3, 5, 6 and 9 Relay Mc, by its make contact 2 and make contact 8 of relay A (Fig. 5) closes the holding circuit of relay A.

Figure 19:
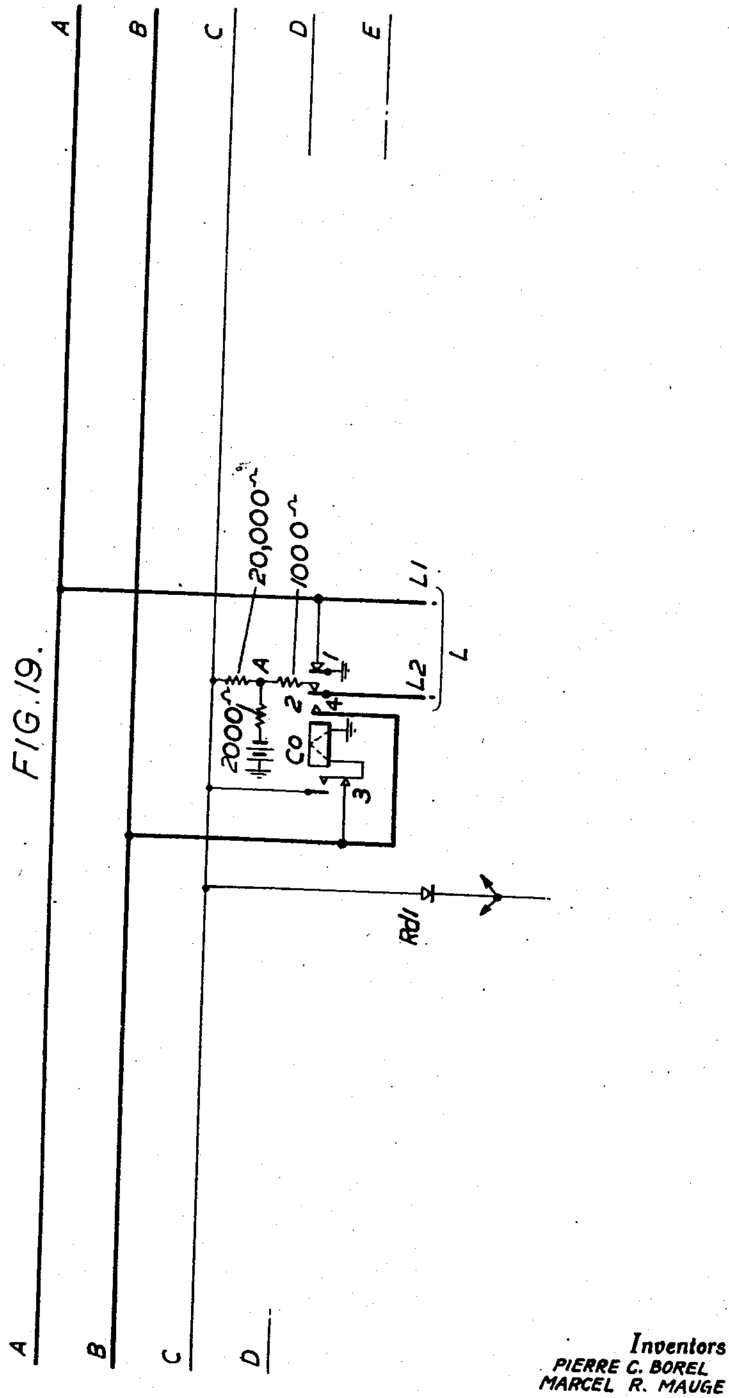
Figures 19 and 20 illustrate two forms of line circuits for effecting the adaptation of the system described to lines of defective insulation.
Figure 20:
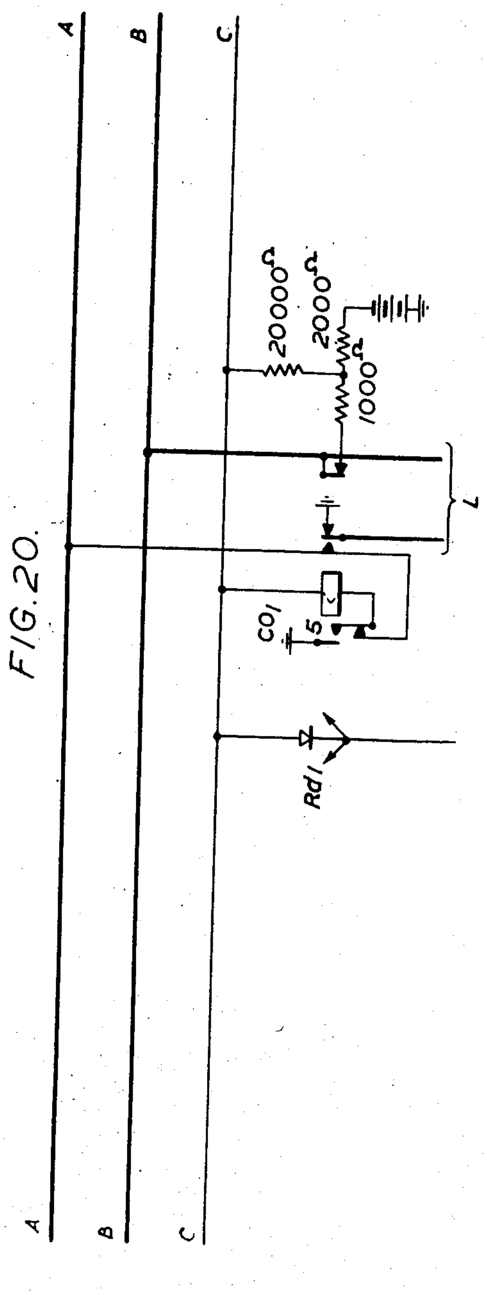

Figures 19 and 20 disclose two embodiments of line circuits suitable for use in the present system to prevent the previously mentioned disadvantages occurring when faulty insulation is encountered on lines.

Referring to Fig. 19, it will be seen that wires L1, L2 and B represent the line wires, wire C is the wire on which the starting potential will appear as previously described. When the circuit is not engaged, one of the lines is connected to ground through break contact 1 of relay Co, the other line wire is connected to the negative terminal of a 48 volt battery by means of the following circuit: break contact 2 of relay Co, 1,000 ohm resistance and 2,000 ohm resistance. The common point of the 1,000 and 2,000 ohm resistances is connected through a 20,000 ohm resistance to wire C. This 20,000 ohm resistance is used, on the one hand to reduce the current flowing through rectifier Rd1, and on the other hand to cause the application on wire C of an availability potential to be compared with the availability potential obtained on wire C with a line circuit as previously described in reference to the main system. When the line is calling, wires L1 and L2 are connected through a resistance the valve of which is between 0 and 1,000 ohms according to the line resistance; the potential on wire c becomes more than —24 volts due to the current flowing in the 2,000 and 1,000 ohm resistances. The current is established through the following circuit: ground, break contact 1 of relay Co, wires L1 and L2 connected through a resistance, break contact 2 of relay Co, 1,000 ohm resistance, 2,000 ohm resistance, negative terminal of 48 volt battery and ground. The potential of wire C becomes positive with respect to the reference potential of the starting circuit (—35 volts), and it controls the hunting for the calling line as previously described. When the line is seized, i. e. when it is connected to a register, the ground on wire A and the negative terminal of a 48 volt battery on wire B are connected through the winding of an impulse relay. Relay Co energises through the following circuit: ground, winding of relay Co, contact 3 of relay Co wire B and battery. Relay Co on energising is disconnected from wire B and is blocked on wire C which is connected by means of the line finder to the negative terminal of a 48 volt battery, through a 250 ohm resistance as already described. Relay Co disconnects wire L1 from ground by opening its contact 1 and wire L2 from the battery by opening its contact 2. Through its make contact 4, relay Co connects wire L2 to wire B. Wires L1 and L2 are then respectively connected to wires A and B.

When wires L1 and L2 are not looped, i. e. when the line is not calling, if this line presents a leakage equivalent to a 10,000 ohm resistance connected between wires L1 and L2 or between wire L2 and ground, a circulation current is established in the 1,000 and 2,000 ohm resistances but the potential on wire C remains less than —35 volts, and then will not cause the starting operation.

Fig. 20 represents another form of the device shown in Fig. 19 in which the operation of relay Co is made through a ground connected on wire A. The operation of the device is approximately the same of that of the device described in connection with Fig. 19 nevertheless the locking of relay Co takes place through the following circuit: ground, make contact 5 of relay Co1, winding of relay Co1, and wire C (connected by means of the line finder, not shown, to the negative terminal of a 48 volt battery, through a 250 ohm resistance).

In the case in which the line is a called line, the operation of relay Co is assured, either in the case of Fig. 19 by connecting a battery on wire B, or in case of Fig. 20 by connecting a ground on wire A.

While the present invention has been described in connection with particular embodiments, it is clear that it is in no way limited to said embodiments and on the contrary is capable of numerous modifications and changes which will clearly appear to those skilled in the art. The specific description, therefore, is considered merely as illustrative of the invention and not as a limitation on the scope of the invention as set forth in the objects thereof and in the accompanying claims.

We claim:

1. An automatic telecommunication exchange system comprising a plurality of subscribers' lines including line circuits having a plurality of conductors but without relays, means for applying a predetermined direct current potential to one of said conductors, which potential is characteristic of a particular class of service to which the individual line is entitled, a plurality of line finder link circuits connected in common to said subscribers' lines, a plurality of registers, means operative upon initiation of a call by a calling subscriber for placing certain of said line finder link circuits under control of a free register, means controlled by said register for causing said line finders to simultaneously hunt for said calling line, means in said register operable upon seizure of said calling line by one line finder for determining the characteristic of said calling line and for preparing said register in accordance with said characteristic to receive dial impulses from said calling subscriber and means controlled by said register for connecting said calling line to a desired called line in response to said dial impulses.

2. The telecommunication exchange system as claimed in claim 1, and further comprising means operative to determine whether more than one line finder has seized said calling line, and means responsive to said last named means for releasing said register and initiating a new hunting operation if more than one line finder has seized said calling line.

3. An automatic telecommunication exchange system comprising a plurality of subscribers' lines, a line circuit for each of said lines having a plurality of conductors including a test conductor and an auxiliary conductor but no relays, means in each line circuit for applying a predetermined direct current potential to said auxiliary conductor, which potential is characteristic of the particular class of service to which the individual line is entitled, switching mechanism for extending connections from said lines, a register circuit for controlling said switching mechanism, an electronic potential comparing device having two input circuits and an output circuit adapted to be energized when the potentials applied to said input circuits bear a predetermined relation to each other, means controlled by the initiation of a call for extending any one of said lines to said register circuit and the auxiliary conductor of the corresponding line circuit to one input circuit of said potential comparing device, means in said register for applying a succession of potentials to the other of said input circuits, and means in said output circuit responsive to the operation of said potential comparing device and controlled by said last-mentioned means for causing said register to operate said switching mechanism for extending the connection only if said calling line is entitled to the particular class of service which permits the completion of the call.

PIERRE CHARLES BOREL.
MARCEL ROGER MAUGE.

References Cited in the file of this patent

UNITED STATES PATENTS

| Number | Name | Date |
|---|---|---|
| 1,690,206 | Raynsford | Nov. 6, 1928 |
| 1,960,037 | Williams | May 22, 1934 |
| 2,005,595 | Roome | June 18, 1935 |
| 2,408,433 | Malthaner | Oct. 1, 1946 |